United States Patent
Vook

(10) Patent No.: US 7,940,247 B2
(45) Date of Patent: May 10, 2011

(54) REDUCING DUST CONTAMINATION IN OPTICAL MICE

(75) Inventor: Dietrich W. Vook, Los Altos, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 1058 days.

(21) Appl. No.: 10/903,830

(22) Filed: Jul. 30, 2004

(65) Prior Publication Data

US 2006/0028447 A1 Feb. 9, 2006

(51) Int. Cl.
*G09G 5/08* (2006.01)

(52) U.S. Cl. .................................... 345/163; 345/166

(58) Field of Classification Search ............ 345/156–184
See application file for complete search history.

(56) References Cited

U.S. PATENT DOCUMENTS

| 5,845,504 A | * | 12/1998 | LeBleu | |
| 2004/0031928 A1 | * | 2/2004 | Smith | 250/380 |
| 2004/0095321 A1 | * | 5/2004 | Sun et al. | 345/163 |

FOREIGN PATENT DOCUMENTS

| JP | 6000 8815 | 1/1985 |
| JP | 429 1615 | 10/1992 |
| JP | 2002 192642 | 7/2002 |
| JP | 2004 013236 | 1/2004 |

OTHER PUBLICATIONS

GB Search Report dated Sep. 16, 2005.

* cited by examiner

*Primary Examiner* — Regina Liang

(57) ABSTRACT

Reduction of dust contamination in optical mice. Trapped charged particles within an optical element result in a surface charge on the optical element, the surface charge reducing the attraction of dust to the optical surface. Charged particles may be trapped in the optical element, or in a coating on the element. Irradiation from an alpha source or ion implantation techniques may be used.

7 Claims, 1 Drawing Sheet

REDUCING DUST CONTAMINATION IN OPTICAL MICE

TECHNICAL FIELD

Embodiments in accordance with the invention are related to optical mice, and methods of reducing dust contamination in optical mice.

BACKGROUND

The computer mouse used for navigation on personal computers has evolved significantly since its invention by Douglas Engelbart, as shown in his U.S. Pat. No. 3,541,541.

The modern computer mouse is not mechanical, but optical. An optical mouse is described in U.S. Pat. No. 6,433,780 by Gordon et al, incorporated herein by reference. An optical mouse has a motion sensor with a light source which illuminates the surface the mouse rests upon. Optical elements focus an image of this surface on an image sensor. Processing electronics connected to the image sensor sense motion by correlating successive images from the image sensor, performing a correlation of successive images with different offsets in X and Y directions, and finding the maximum of the correlation surface.

Dust contamination of the optical elements reduces the effectiveness of the optical mouse by creating a fixed pattern in sensed images. While this is less of a problem with mice which use conventional imaging, since such dust is out of the focal plane, it is of particular concern in optical mice using interference imaging. The fixed pattern created by dust leaves a peak in the correlation function at zero displacement. For small motions, this central peak at zero motion in the correlation function distorts the algorithms which find the sub-pixel resolution peak.

SUMMARY OF THE INVENTION

Dust contamination on the optical surfaces of optical mice is reduced by embedding positive charges in optical components. Trapping charged particles in the optical element induces a surface charge, reducing attraction of dust to the optical surfaces. Exposure to an alpha source or ion implantation techniques may be used to create the surface charge. The charged particles may be trapped in the optical element, or in a coating on the optical element.

DETAILED DESCRIPTION OF THE EMBODIMENTS

Figure 1:
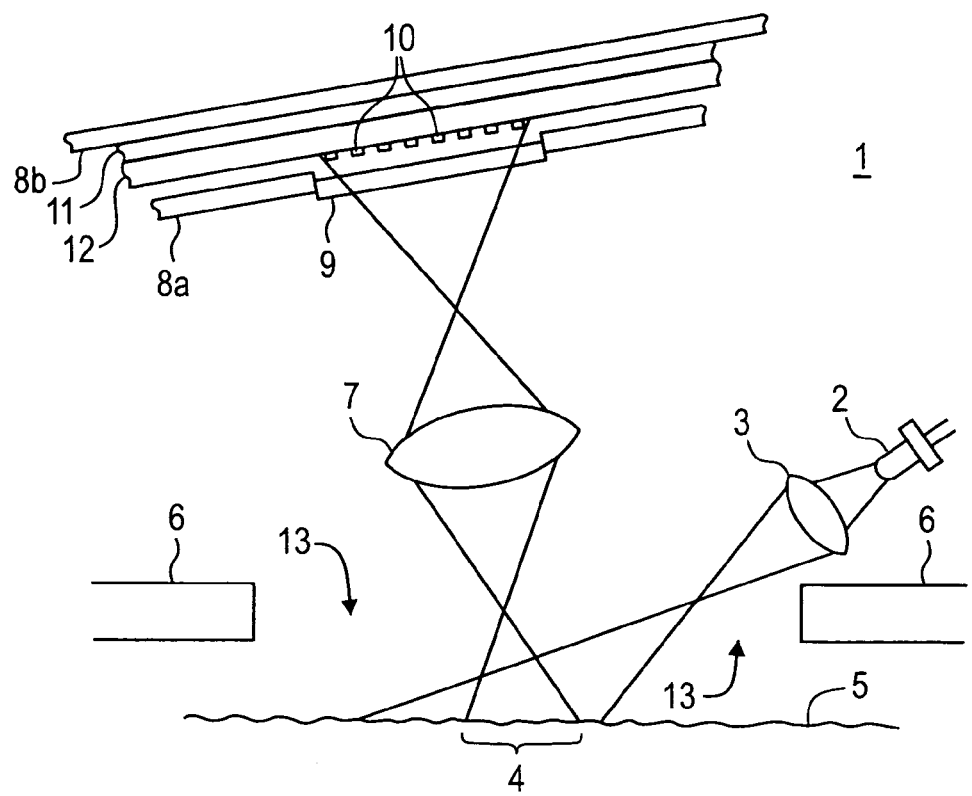
FIG. 1 shows a view of an optical mouse known to the art.

FIG. 1 shows a cut-away side-view of an optical mouse 1 known to the art. Light source 2 emits light which is projected by lens 3 (which may be separate as shown, or may be integrated into the package of source 2), through orifice 13 in bottom surface 6 and onto a region 4 that is part of a work surface 5. Although omitted for clarity, orifice 13 might include a window transparent to the light from source 2, and which serves to keep dust, dirt, or other contamination out of the innards of mouse 1. Light from the illuminated region 4 illuminated photodetector array 10 through window 9 and lens 7. Integrated circuit package portion 8a may dispense with separate window 9 and lens 7 by combining them into one and the same element. Photodetector array 10 is fabricated onto a portion of an integrated circuit die 12 affixed by adhesive 11 or other means to package portion 8b. Photodetector array 10 sends image data to a processor, not shown for purposes of clarity.

The processor deduces X and Y motion by correlating successive images from image sensor 10. Successive images are correlated with different X and Y offsets, producing a correlation surface. The maximum on this correlation surface gives the X and Y offset between images, and therefore the X and Y motion.

Dust contamination on optical surfaces reduces the effectiveness of this process by creating a fixed pattern on these images. This fixed pattern leaves a peak in the correlation function at zero displacement, zero motion. For small motions, this central peak in the correlation function at zero motion distorts the algorithms searching for correlation peaks.

According to the present invention, producing a surface charge on the optical elements reduces the attraction of dust to the optical surface. According to the present invention, a surface charge is produced on the optical element, reducing dust contamination. The surface charge may be produced by irradiating the optical element with an alpha particle source. Ion implant technology common to semiconductor processing may also be used, including ion implanting, ion plasma sources, or reactive ion etching technology.

Referring to FIG. 1, candidates for such treatment include optical elements 3, 7, and any covering of orifice 13. A candidate for such treatment will be an optical surface which is exposed to the environment and susceptible to dust contamination.

Alpha particle sources include radioisotopes of a number of elements, particularly of Actinide elements such as Americium and Curium. An Alpha particle consists of two protons and two neutrons bound together in a particle which is identical to a helium nucleus, and can be written as $He^{2+}$. Alpha particles have a high energy level (5.4 to 5.6 MeV for isotopes of Americium), and are easily absorbed by materials, the alpha particles stopping at a short depth within the target material.

Figure 2:
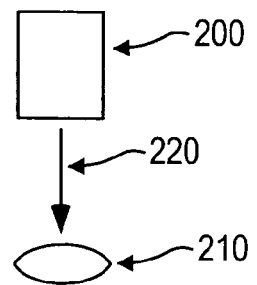
FIG. 2 shows particle irradiation of optical parts.

As shown in FIG. 2, optical element 210 is exposed to particles 220 from source 200. These particles lodge below the surface of the optical element, inducing a positive surface charge. With plastic optical elements, the surface plastic between the charged particles and the plastic surface will be polarized, creating a positive charge on the surface of the optical element. This surface charge acts to reduce the attraction of dust to the optical surface. As stated source 200 may be an alpha particle source, or an ion source.

Glass elements may also be treated. Additionally, a stored charge may be trapped in a coated layer placed on the optical element. Coatings such as silicon nitride ($Si_3N_4$) or silicon dioxide ($SiO_2$) may be used on either glass or plastic optical elements.

While the embodiments of the present invention have been illustrated in detail, it should be apparent that modifications and adaptations to these embodiments may occur to one skilled in the art without departing from the scope of the present invention as set forth in the following claims.

The invention claimed is:

1. An improved motion sensor in an optical mouse, the motion sensor comprising an optical element, the optical element having a surface charge from trapped charged particles in the optical element, wherein the trapped charged particles in the optical element include alpha particles or ions.

2. The improved motion sensor of claim 1 where the charged particles are trapped in a coating layer of the optical element.

3. The improved motion sensor of claim 1 where the trapped charged particles in the optical element are produced by irradiating the optical element with alpha particles from a radioisotope source.

4. The improved motion sensor of claim 1 where the trapped charged particles in the optical element are produced by exposing the optical element to an ion source.

5. A method of producing an improved motion sensor in an optical mouse, the method comprising:

selecting an optical component in the optical mouse, and inducing a surface charge in the optical element, including introducing charged particles into the optical component, wherein the charged particles include alpha particles or ions.

6. The method of claim 5 where the step of inducing a surface charge in the optical element comprises exposing the optical element to an alpha particle source to introduce the alpha particles into the optical component as the charged particles.

7. The method of claim 5 where the step of inducing a surface charge in the optical element comprises exposing the optical element to an ion source to introduce the ions into the optical component as the charged particles.

* * * * *